US005624064A

United States Patent [19]
McGee, Jr.

[11] Patent Number: 5,624,064
[45] Date of Patent: Apr. 29, 1997

[54] FLUID-CONTAINER AND MOUNT THEREFOR

[75] Inventor: John W. McGee, Jr., Richmond, Va.

[73] Assignee: M-J Partnership, Chester, Va.

[21] Appl. No.: 427,822

[22] Filed: Apr. 26, 1995

[51] Int. Cl.$^6$ .................................................. B62J 11/00
[52] U.S. Cl. .......................... 224/414; 224/451; 224/459; 224/926; 215/373; 220/737
[58] Field of Search ........................ 224/547, 926, 224/148, 35, 148.4, 148.7, 414, 451, 459; 229/103.1; 215/373, 371, 378; 220/737

[56] References Cited

U.S. PATENT DOCUMENTS

| | | |
|---|---|---|
| 1,728,883 | 9/1929 | Simon .............................. 215/373 X |
| 3,079,037 | 2/1963 | Schecter ............................ 220/212 |
| 3,107,028 | 10/1963 | De Robertis ...................... 220/212 |
| 3,212,660 | 10/1965 | Adell . |
| 3,225,951 | 12/1965 | Poston . |
| 3,533,526 | 10/1970 | Adell . |
| 4,009,810 | 3/1977 | Shook . |
| 4,095,812 | 6/1978 | Rowe . |
| 4,345,704 | 8/1982 | Boughton . |
| 4,366,922 | 1/1983 | Levine . |
| 4,386,721 | 6/1983 | Shimano . |
| 4,441,638 | 4/1984 | Shimano . |
| 4,634,028 | 1/1987 | de Larosiere . |
| 4,640,895 | 2/1987 | Davis . |
| 4,830,239 | 5/1989 | Tackles . |
| 4,830,240 | 5/1989 | Tackles . |
| 4,928,876 | 5/1990 | Marshall ........................... 224/926 X |
| 4,948,080 | 8/1990 | Jack . |
| 4,957,227 | 9/1990 | Trimble . |
| 5,005,716 | 4/1991 | Eberle .............................. 215/373 |
| 5,040,709 | 8/1991 | Neugent . |
| 5,115,952 | 5/1992 | Jenkins . |
| 5,158,218 | 10/1992 | Wery ............................. 224/414 X |
| 5,170,981 | 12/1992 | Lin . |
| 5,238,160 | 8/1993 | Faulds . |
| 5,249,702 | 10/1993 | Topp . |
| 5,251,777 | 10/1993 | McMahon . |

FOREIGN PATENT DOCUMENTS

| | | | |
|---|---|---|---|
| 2501144 | 9/1982 | France .......................... 224/926 |
| 2599235 | 12/1987 | France .......................... 215/379 |
| 403159830 | 7/1991 | Japan ........................... 224/926 |

*Primary Examiner*—Renee S. Luebke
*Attorney, Agent, or Firm*—Cushman Darby & Cushman IP Group of Pillsbury Madison & Sutro LLP

[57] ABSTRACT

A fluid-holding container and a member for mounting the container to an object. The fluid-holding container is formed to have a concave bottom portion and sidewalls connected to the bottom portion. At the center of the bottom portion, a channel extends into the interior of the fluid-holding container. The channel is adapted to engage with a securing post of a mounting member. The mounting member includes a base portion that is attached to the object. The distance between the sidewalls and the center axis of the fluid-holding container is substantially equal to the distance between the center of the securing post and the base portion, thus assuring a secure attachment of the container to the mounting member. The present invention is suitable for use in mounting a water bottle to a bicycle.

31 Claims, 2 Drawing Sheets

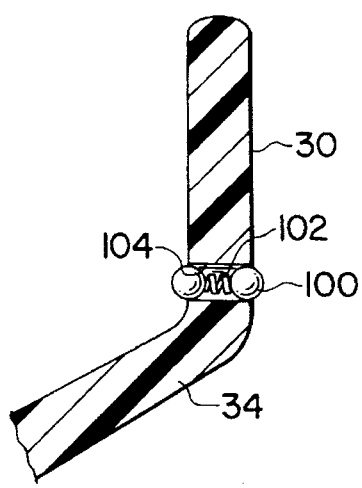
FIG. 3
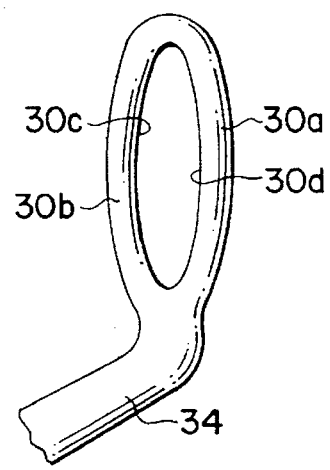
FIG. 4
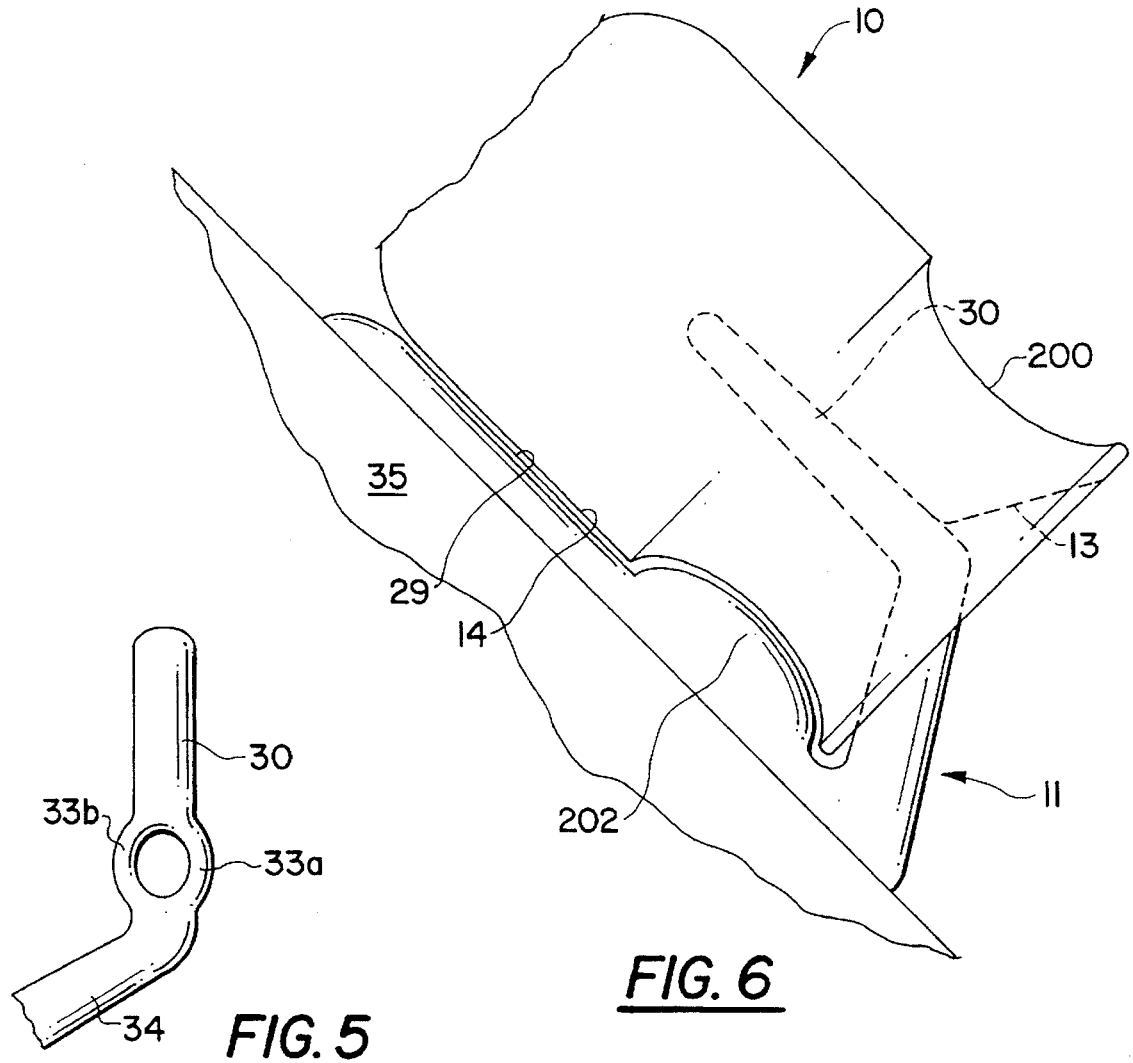
FIG. 5
FIG. 6

FLUID-CONTAINER AND MOUNT THEREFOR

BACKGROUND OF THE INVENTION

1. Field of the Invention

The present invention relates to a fluid-holding container and a device for mounting the container to an object. More particularly, the present invention is directed toward a mount and a detachable bottle for use with such objects as bicycles.

2. Related Art

A person riding a bicycle any significant distance needs to hydrate himself or herself at regular intervals in order to prevent fatigue and dehydration as a result of the physical exertion and the evaporative effect of the wind encountered while riding. Over the years the most effective method of accomplishing hydration has been to securely attach to the frame of the bicycle one or more mounting devices into which could fit a removable plastic or similar material bottle filled with water, juice or any of a variety of drinking fluids. When the rider so desires, the bottle is pulled from the mount; a drink is taken; and the bottle is replaced back into the mount. This is all done preferably while continuing to ride the bicycle.

Since the 1940's, or perhaps even earlier, the mounting device or "cage", as it is termed, that is used to hold a water bottle to a bicycle has been a basket-type device made of bent and formed light gauge solid metal tubing into which the bottle would fit snugly. With more recent technology, cages have been manufactured from molded polymer materials. But despite countless changes in shape, cosmetic appearance and material type, the function of the cage has remained unchanged for decades. It is this relationship between cage and bottle that the present invention addresses.

Despite a generally acceptable operating history, the standard cage and bottle system possesses a fundamental flaw in its function in that it is often clumsy to use, and will exhibit this trait at critical times when it may impact upon the safety of the rider and/or, in the case of a racing scenario, thee consistent speed of the rider. The basis for this flaw lies in the fact that any bottle will be nearly the exact same size as any cage into which it must fit. In other words, the physical relationship between bottle and cage is much like that of a key and lock. There is little allowance for not having the bottle located exactly over the cage opening when replacing the bottle. In the physically dynamic environment for riding a bicycle, this can provide for a precarious safety situation as well as a general inconvenience. That is, the rider may be forced to avert his eyes from the road in front of him in order to replace the bottle in the cage after drinking from the bottle. Obviously, this could endanger the rider, as momentarily, attention is not focused upon the road.

A bicyclist's most pressing responsibility in preserving a margin of safety while riding is to maintain a high visual awareness of the immediate surroundings. The existing cage and bottle design often requires that the rider, whether novice or expert, look down at the cage when replacing the bottle in order to accurately position the bottle with respect to the cage. These several seconds when the rider's attention is diverted away from the road present a window of opportunity for accident and subsequent injury. Common examples of typical situations which illustrate the need for a rider to maintain diligent awareness include: riding along the edge of a paved road which has a jagged, uneven border of broken asphalt; riding in close proximity to vehicular traffic; riding with a young child attached to the bicycle with a child's safety seat; riding in an off-road situation in an environment of uneven terrain, loose rock and soil, and underbrush, with abruptly changing grade and elevation; and, racing in a "pace line" in which a half dozen or more bicycle racers will be riding at speeds of up to 45 miles per hour in single file formation with only several inches of separation between bicycles. In addition to the safety issue, the potential aggravation caused by the inconvenience of the existing bottle and cage design detracts from the enjoyment sought by a bicyclist out for a ride.

It is also known to provide a water bottle having a dovetail attachment that connects with the mount. Such an arrangement requires the rider to orient the water bottle so that the dovetail insert is aligned with the receptacle therefor. Such a design requires the rider to look down and divert attention from the road or track, thus creating the potential for an accident.

Another design for a water bottle and mount for affixing the bottle to a bicycle frame includes the use of VELCRO on both the sidewalls of the bottle and a surface of the mounting member. By aligning the bottle with the mounting member, the bottle will be held in place by the VELCRO. However, this bottle and mount has the same problems as does the cage apparatus described above. That is, the rider must look down to ensure that the VELCRO on the bottle is aligned with that of the mounting member so that the bottle attaches to the mounting member. If the two sections of VELCRO do not meet, the bottle will not be fastened to the mounting member. It is clear that this bottle and mount also requires that the rider divert attention from the road in order to ascertain that the bottle is secured to the mount.

Another design of a water bottle for a bicycle has been use of a tear-drop shaped bottle that mounts to a post extending from a mounting structure. The bottle is flat on two sides and requires careful alignment between the bottle and mount. The bottle is not of cylindrical cross section, thus forcing the user to orient the bottle with respect to the mount when the bottle is replaced.

None of the known designs discussed above allow the rider to easily replace a bottle on a mount therefor when the rider is riding a bicycle. All known designs require that the rider orient the bottle, thus requiring the rider to divert attention from the road. A bottle that is easily replaceable by the rider without requiring diversion of attention is still desirable.

SUMMARY OF THE INVENTION

It is accordingly an object of the present invention to provide a beverage container adapted for easy securement to the frame of a bicycle and to provide a device that allows for replacement of a fluid container, but does not require the rider to avert any attention from the road during the replacement process.

The object of the present invention is accomplished by the present invention, which includes a water bottle having a concave bottom portion including a first and second section, and a mounting structure that includes a securing post adapted to engage the second section. The second section may include a snap location, at which the bottle firmly attaches to the securing post. The mounting structure may be mounted to any object, such as a bicycle frame, a pull cart for golf clubs, a bed, the interior of an automobile, etc. The fluid-containing member, when joined with the mounting structure, is easily replaceable without requiring the rider to divert attention from the road.

In a preferred embodiment, the sidewall portion of the fluid container is of substantially circular cylindrical contour, and the bottom portion is a funnel-type conic shape, i.e. the bottom is concave, centered upon the central, longitudinal axis of the fluid container. The bottom portion may also be of trumpet or bell shape, provided that the bottom portion is always concave. The mounting member includes a bridging member, which preferably permits slight resilient movement of a securing post attached thereto. The securing post is generally positioned upon the center, longitudinal axis of the bottle, but the forward extremity of the post is preferably angled slightly toward the base portion. This angled configuration, in conjunction with the resilient movement imparted by the bridging member causes the bottle to be tightly embraced between the base portion and the securing post.

BRIEF DESCRIPTION OF THE DRAWINGS

Other objects, features, and characteristics of the present invention, as well as the method of operation and the function of the related parts, will be better understood from a study of the following detailed description taken in conjunction with the appended claims and drawings, all of which form a part of this application. In the drawings, like reference numerals represent like elements, and:

FIG. 3 is a cross sectional view of the securing post using an alternate method for holding the fluid container firmly in position;

FIG. 4 is a plan view of a third embodiment of a securing post employing a dual leaf spring arrangement to hold the fluid containing member to the holder;

FIG. 5 illustrates an alternative embodiment of a snapping region that utilizes a dual leaf spring design only in the snapping region; and FIG. 6 illustrates a further embodiment in which the fluid holding member may be secured to the holder.

DETAILED DESCRIPTION OF THE PRESENTLY PREFERRED EXEMPLARY EMBODIMENTS

Figures 1, 2:
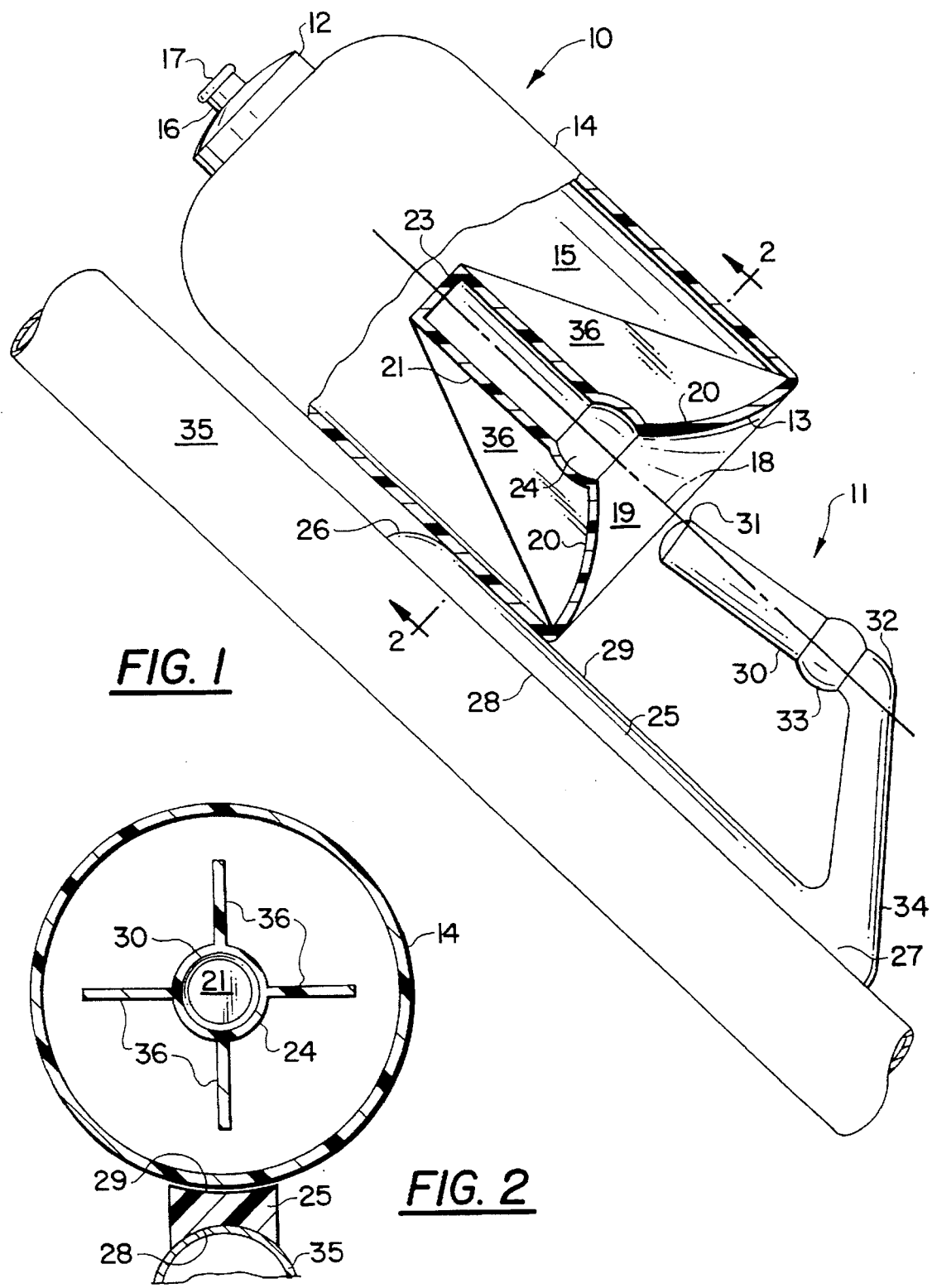
FIG. 1 is a side view of a preferred embodiment of the fluid container and holder combination of the present invention mounted to a bicycle frame.
FIG. 2 is a sectional view taken along line 2—2 in FIG. 1.

Referring to FIGS. 1 and 2, an embodiment of the fluid container and holder therefor is depicted. The illustrated combination according to the present invention includes bottle 10 and holder 11, where the holder 11 is mounted to a bicycle frame 35.

Bottle 10 is preferably constructed of a thermoplastic polymer such as polyethylene, polypropylene, acrylonitrile-based polymers, polyesters, and equivalent polymers which will not leach components into water. Suitable polymers are those recognized as being safe to utilize with foodstuffs, and also proven as having good durability to outdoor weathering factors. Fabrication of the bottle is preferably by way of a molding or other thermoforming operation. It is also possible that the bottle be made of a substance other than a thermoplastic polymer, such as a metal, i.e. aluminum. However, such a bottle would be subject to damage such as dents, and could eventually lose the ability to couple securely to the securing post 30 of mount 11.

The bottle is comprised of top portion 12, bottom portion 13 and sidewall portion 14, the portions collectively defining interior region 15. A mouth opening 16 and interactive snap-fitting tethered cap 17 are disposed in top portion 12.

In other embodiments however, other equivalent designs of closure means may be utilized. In general, the closure means must be capable of quick and easy manipulation, usually allowing the rider of the bicycle to open the bottle by using teeth in order to steer the bicycle with one hand while holding the bottle with the other hand.

Sidewall portion 14 is preferably of a substantially circular cylindrical configuration centered upon a central, longitudinal axis 18. In certain embodiments, longitudinal or circumferential depressions or combinations thereof or other discontinuities or irregularities (not pictured) in the sidewall surface may be present to facilitate gripping by the biker. Also, for ease of manufacturing, sidewall portion 14 may be slightly tapered to allow for easy removal from a mold. The sidewall portion is preferably sufficiently thin to have resilient characteristics, thereby enabling the bottle to be compressed by squeezing so as to dispense its liquid contents through opening 16.

Bottom portion 13 includes a first section concave inwardly toward interior region 15. In the first embodiment, the concavity of the first section is in the form of a funnel-like trumpet-shaped surface 19 centered upon axis 18. In alternative equivalent embodiments, the concavity of the first section may be bell-shaped or cone-shaped. The generalized characteristic of the concave first section is such that its cross-sectional shape, taken in planes orthogonal to axis 18, is circular, and the diameter of the circle diminishes progressively at locations of the bottom portion 13 more advanced into interior region 15. The cross-sectional contour of the exemplified trumpet-shaped first section, taken in a plane containing axis 18, is manifested as two convergent arcuate lines 20 convex and substantially asymptotic with respect to axis 18. In the case of bell-shaped and conical surfaces, the comparable cross-sectional configuration would show convergent arcuate lines, or straight lines, respectively.

It is also possible that bottom portion 13 is formed separately from the rest of bottle 10 and then assembled by gluing or otherwise fastening bottom portion 13 to sidewall portion 14.

Bottom portion 13 also includes a second section formed as an elongated channel member 21 extending from the innermost portion of the first section as a continuous integral extension thereof. Elongated channel member 21 is formed so as to extend from the center of concave first section into the interior portion 15 along axis 18, and terminates in a closed distal extremity 23. The distal extremity is preferably disposed between about 30% and 70% of the distance between the top and bottom portions. That is, the channel member 21 together with bottom portion 13 has a combined length approximately equal to half the height of the bottle 10. The interior of the exemplified channel member 21 is of generally circular cylindrical contour. The contour of channel member 21 may alternatively be conical, tapering inwardly toward axis 18 with progression toward top portion 12. An annularly enlarged locking region 24 is formed within channel member 21. The cross-sectional contour of the locking region, taken in a plane containing axis 18 is manifested as two facing arcuate lines concave with respect to the axis 18. The locking region is shown disposed in contiguous relationship with bottom portion 13, but may be located elsewhere in channel member 21. Reinforcing vanes 36 extend between channel member 21 and the interior surfaces of bottle 10. The vanes are integral with the bottle, having been formed during the molding operation that produces the bottle. These vanes 36 add support to channel member 21. Vanes 36 may either join the channel member 21 along its entire length, as pictured in FIG. 1, or for only a fraction thereof. It is equally possible to add support to channel member 21 by thickening the sidewalls thereof and eliminating the vanes. It is also possible to use both vanes and a thickened channel wall.

Holder 11 is preferably of monolithic construction, fabricated of an engineering grade plastic such as nylon, polyester or a plastic/fiber composite composition utilizing glass or graphite fiber. The holder may also be formed of metal, but plastic is the preferred material, due to both weight and ease of manufacturing. Holder 11 may be formed of cast metal or alloy, or formed from individual metal pieces. It is also possible that holder 11 is made from ceramic. The holder is comprised of elongated straight base portion 25 extending between forward and rearward extremities 26 and 27, respectively, and bounded by a first surface 28 configured to contact the frame 35 or the object to which the bottle is to be mounted, and an opposed second surface 29. Opposed second surface 29 is preferably shaped so that the bottle 10 slides smoothly therealong. That is, the shape of sidewall portion 14 may complement the shape of opposed surface 29 as shown in FIG. 2. Securing post 30 extends between its tip 31 and the base thereof 32 that joins bridging portion 34. The securing post 30 is configured to make relatively tight fitting insertive engagement with channel 21, and is further provided with an annularly enlarged snapping region 33 positioned and contoured as to engage the locking region 24 of the channel 21.

The bridging portion 34 extends in joinder between the base portion 25 and the base 32 of the securing post 30, causing the base portion 25 and securing post 30 to be in substantially parallel coplanar disposition, producing a generally J- or U-shaped appearance of holder 11, and causing post 30 to be resiliently biased toward base portion 25. The spacing between the second surface 29 of the base portion 25 and the securing post 30, measured transversely to axis 18 is substantially equal to the spacing between axis 18 and the exterior surface of sidewall portion 14. Accordingly, when the bottle 10 is forced into engagement with the holder 11 in a manner wherein post 30 inserts into channel member 21, sidewall portion 14 is frictionally secured by the second surface 29 of base portion 25.

First surface 28 of base portion 25 is adapted to be removably attached to the frame 35 of a bicycle or any other object, such as a pull cart for a golf bag, a bed, the interior of a car, etc. Attachment may be achieved by way of clamps, bolts, tying, adhesives, or hook and loop fastener material.

In operation of the preferred embodiment, the biker can remove the bottle from the holder by a simple pulling action. The bottle is easily returned to the holder because the funnel-shaped bottom portion presents a large target area to securing post 30 and further guides the post 30 into channel member 21. In the first embodiment of FIG. 1, by pressing slightly to urge the bottle rearwardly, the snapping region 33 of post 30 snaps into engagement with the locking region 24 of the channel member. Such effect, combined with the tensioning action of the post, forces the sidewall portion 14 into strong contact with base portion 25, securing the bottle 10 upon the holder 11.

FIG. 3 illustrates a second embodiment of securing post 30 according to the present invention. In this embodiment, securing post 30 includes a tunnel or hole 104 formed completely therethrough. The snapping device could include a ball and spring device. Metal balls 100 are joined by spring mechanism 102, which would keep balls 100 in position outward beyond the surface of securing post 30 but contained as part of the post. When bottle 10 is slid over securing post 30, balls 100 would depress spring 102 as channel 21 was moved into position over securing post 30. Spring 102 would force balls 100 outward when balls 100 reached locking portion 24, thus securing bottle 10 to securing post 30.

FIG. 4 illustrates yet another possible embodiment of securing post 30. In this embodiment, the securing post is formed as a dual leaf spring mechanism running the length of the securing post. Concave faces 30c and 30d of springs 30b and 30a, respectively, oppose one another, and the convex faces of springs 30a and 30b are designed to press against the walls of channel member 21 formed in bottle 10. Channel member 21 could be formed either straight or slightly contoured to fit the curvature of springs 30a and 30b.

FIG. 5 shows another embodiment of securing post 30. In this embodiment, only snapping region 33 is formed as a dual leaf spring, having springs 33a and 33b which interact with locking region 24 to secure bottle 10 to securing post 30.

FIG. 6 illustrates the embodiment where the bottle 10 includes a groove 200 formed at a lower end thereof in sidewall portion 14. Second surface 29 of base portion 25 is, in this embodiment, provided with a member 202, which protrudes from base portion 25 and that snaps into groove 200. The combination of the friction between the sidewall portion 14 and the second surface 29 and the snapping of member 202 into groove 200 secures the bottle to the holder 11. Because groove 200 extends around the entire circumference of the bottle 10, there is no improper orientation of the bottle 10 when it is being replaced. That is, the rider need not worry about aligning groove 200 with member 202 since groove 200 extends around the entire perimeter of bottle 10. It is equally possible that groove 200 be located at any position along sidewall portion 14 with member 202 being disposed on second surface 29 in a complementary position.

In the embodiment of FIG. 6, securing post 30 acts only as a guiding post for bottle 10, but does not lock the bottle to post 30. In order to lock bottle 10 to holder 11, member 202, which protrudes from base portion 25 will snap into groove 200 formed about the periphery of bottle 10. The combination of the tensioning action of post 30 pressing sidewall portion 14 against second surface 29 and the fit of member 202 into groove 200 serves to lock bottle 10 to holder 11.

Alternatively, a groove would be formed around the circumferential interior of channel member 21, rather than locking region 24. Securing post 30 could include a member that fits into the groove on the inner periphery of the channel 21 member. The combination of the groove/member and the tension applied by means of securing post 30 pressing sidewall portion 14 against second surface 29 will secure the bottle 10 to the holder 11.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. A combination of a container and a holder for securement of said container to an object, said combination comprising:

a container having a bottom portion and sidewalls connected to said bottom portion, said bottom portion and said sidewalls defining an interior region, said bottom portion including a first section concave towards said interior region and attached to said sidewalls and a second section defining a channel along a central longitudinal axis of said container, said second section extending into said interior region and being substantially parallel to said sidewalls; and a holder having a base portion for mounting to said object, said base portion adapted to be attached to said object, a bridging portion connected to said base portion, and a securing post extending from said bridging portion, said securing post adapted to engage said second section, said base portion including a first surface to press against said object and a second surface opposite said first surface configured so as to contact at least a portion of said sidewalls.

2. The combination of claim 1 wherein the securing post is formed of a resilient material.

3. The combination of claim 2, wherein the bridging portion is formed of a flexible material.

4. The combination of claim 2 wherein the securing post is resiliently biased toward the base portion.

5. The combination of claim 1 wherein said container is a squeeze bottle adapted to dispense a liquid when squeezed.

6. The combination of claim 1 wherein said container is made of a thermoplastic polymer.

7. The combination of claim 1 wherein said first section is formed so as to be shaped like a funnel with said second section extending into said interior region from a portion of said funnel that is disposed deepest within said interior region.

8. The combination of claim 7 wherein said funnel has a circular cross section that decreases in size towards said interior region.

9. The combination of claim 1, wherein said container further comprises a cover member having an opening disposed therein.

10. The combination of claim 1 wherein said second section is of circular cylindrical configuration with walls thereof being substantially parallel to said sidewalls.

11. The combination of claim 1 wherein reinforcing vanes extend between said channel and said bottom portion, said vanes being integral with the container.

12. The combination of claim 1, wherein a distance between said central longitudinal axis and said sidewalls is substantially equal to a distance between an axial center of said securing post and said second surface of said base portion.

13. The combination of claim 1, wherein said securing post is formed as a dual spring leaf post, with the springs locking the fluid containing member to said securing post.

14. The combination of claim 1, wherein said securing post includes a snapping portion having dual leaf springs, and said channel includes a locking portion that engages with said snapping portion.

15. The combination of claim 1, wherein said container includes a groove disposed around a lower periphery thereof and said holder includes a protrusion from said base member which interacts with said groove when said fluid-holding member is disposed on said holder.

16. The combination of claim 1, wherein said securing post includes a tunnel formed therethrough, with a ball and spring mechanism being disposed in said tunnel so as to secure said securing post to said fluid-holding member.

17. A combination of claim 1, wherein said container is constructed and arranged to contain fluid.

18. A combination of a container and a holder for securement of said container to an object, said combination comprising:

a container having a bottom portion and sidewalls connected to said bottom portion, said bottom portion and said sidewalls defining an interior region, said bottom portion including a first section concave towards said interior region and attached to said sidewalls and a second section defining a channel along a central longitudinal axis of said container, said second section extending into said interior region and being substantially parallel to said sidewalls; and a holder having abase portion for mounting to said object, said base portion adapted to be attached to said object, a bridging portion connected to said base portion, and a securing post extending from said bridging portion, said securing post adapted to engage said second sections, wherein a locking region is formed in said second section and said securing post includes a snapping member that engages with said locking region.

19. A combination of claim 18, wherein said container is constructed and arranged to contain fluid.

20. The combination of claim 18, wherein said snapping member comprises dual leaf springs which engage with said locking region.

21. The combination of claim 18, wherein said snapping member comprises a ball and spring mechanism which engages with said locking region.

22. A container constructed and arranged to be mounted to an object via a mounting member, comprising:

a bottom portion and sidewalls connected to said bottom portion, said bottom portion and said sidewalls defining an interior region;

said bottom portion including a first section and a second section, said first section having walls contiguous with said sidewalls, said first section formed in said bottom portion so as to be concave towards said interior region;

said second section being formed along a longitudinal axis of said container, said second section being integrally connected to said first section so as to extend entirely within said interior region;

said second section being defined by walls contiguous with walls of said first section, said walls of said second section being substantially parallel to all said sidewalls;

wherein said second section includes a locking region constructed and arranged to allow for cooperative relationship with said mounting member.

23. A container as claimed in claim 22, wherein said container is formed from a thermoplastic polymer.

24. A container as claimed in claim 22, further comprising a top portion connected to said sidewalls opposite said bottom portion, wherein said top portion includes a passage therein for allowing fluid to exit from said container.

25. A container as claimed in claim 22, wherein said locking region includes means for engaging said mounting member so that movement of the container in directions along the longitudinal axis is resisted.

26. A container as claimed in claim 22, wherein a cross-sectional contour of said locking region taken in a plane including the longitudinal axis includes two facing arcuate portions concave with respect to said longitudinal axis.

27. A containing system comprising a symmetrical container having a central longitudinal axis, and a mount, wherein:

said container includes a concave guiding structure formed as a bottom portion of said container and sidewall structure contiguous with said bottom portion, accepting means for cooperating with said mount and joined to said bottom portion, said accepting means being formed so as to be substantially parallel to said sidewall means;

said mount including securing structure constructed and arranged to cooperate with said accepting means in such a manner that said container may be engaged securely with said mount so that movement of the container in directions along the longitudinal axis is resisted.

28. A containing system as claimed in claim 27, wherein said accepting means includes a locking region, a cross-sectional contour of said locking region taken in a plane including the central longitudinal axis includes two facing arcuate portions concave with respect to said central longitudinal axis.

29. A containing system comprising a symmetrical container and a mount, wherein:

said container has a central longitudinal axis and includes a concave guiding structure formed as a bottom portion of said container and sidewall structure contiguous with said bottom portion, accepting means for cooperating with said mount and joined to said bottom portion and extending along said central longitudinal axis, said accepting means being formed so as to be substantially parallel to said sidewall structure;

said mount includes means for coupling said mount to a frame of a two-wheeled vehicle, and said mount including securing structure constructed and arranged to cooperate with said accepting means such that said container may be self-guidingly mounted on said mount without the need for an operator of the vehicle to make eye contact with the container or the mount.

30. A containing system as claimed in claim 29, wherein said mount and said container are constructed and arranged in such a manner that said container may be engaged securely with said securing structure so that movement of the container in directions along the longitudinal axis is resisted.

31. A containing system of claim 30, wherein said container is constructed and arranged to contain fluid.

* * * * *